June 2, 1970      W. HEIER      3,515,312

LIQUID DISPENSER

Filed July 8, 1968      2 Sheets-Sheet 1

INVENTOR
WILLIAM HEIER

BY Barry Moyerman

ATTORNEY

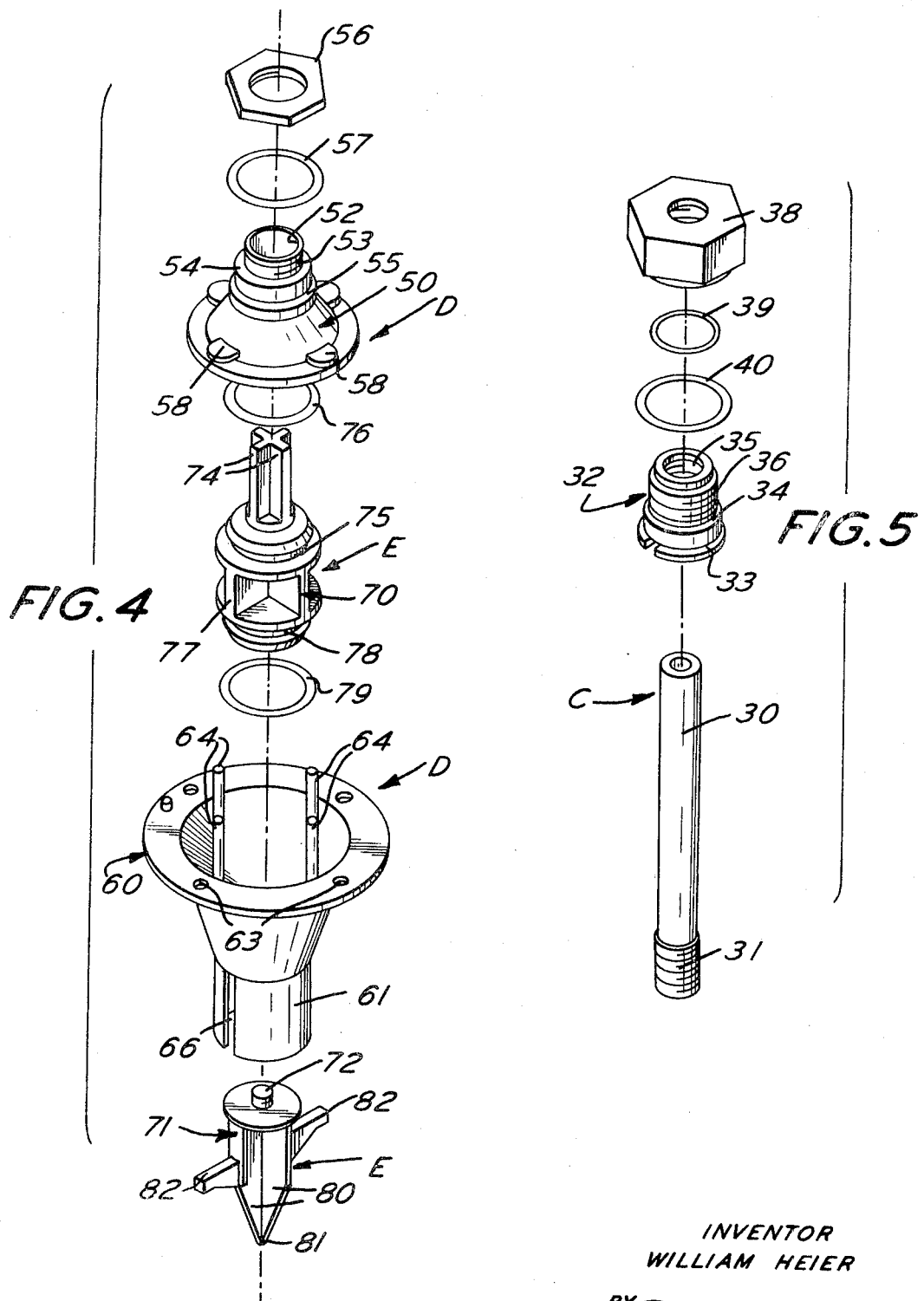

United States Patent Office 3,515,312
Patented June 2, 1970

3,515,312
LIQUID DISPENSER
William Heier, Warminster, Pa., assignor, by direct and mesne assignments, of fifty percent each to Automatic Retailers of America, Inc., Philadelphia, Pa., a corporation of Delaware, and Har-Wil Corporation, Warrington, Pa., a corporation of Pennsylvania
Filed July 8, 1968, Ser. No. 743,230
Int. Cl. B67d 5/62
U.S. Cl. 222—146                          9 Claims

ABSTRACT OF THE DISCLOSURE

A liquid dispenser is disclosed which operates in conjunction with a large reservoir. Liquid flows by gravity into a closed metering tank with which there is operatively associated a valve housing containing a reciprocating valve body. In a first and normal position of the valve body, liquid flows from the reservoir into the measuring tank with the air displaced thereby being vented to atmosphere. The effective capacity of the measuring tank is varied by adjustment of the vent inlet within the measuring tank. The measuring tank thus contains a predetermined unit volume of liquid ready for dispensing. Movement of the valve body to a second position stops flow from reservoir into tank and causes the measuring tank to discharge. Removal of actuating forces allows normal bias to restore the valve body to its first position so that the tank again fills and the cycle may be repeated. The metering tank may be heated throughout its mass so that it acts as a heat sink ready to transfer sensible heat into the liquid flowing into it.

BACKGROUND OF THE INVENTION

Field of the invention

The invention pertains to liquid dispensers. More particularly it pertains to liquid dispensers which utilize chambers or traps for metering predetermined quantities of liquid. It further pertains to dispensers which utilize a slide valve arrangement and which, optionally, provide means for heating of dispensed liquids.

Prior art

Admittedly the prior art relative to liquid dispensers is vast and all but a small segment of this art is unknown to applicant. This segment has to do with liquid dispensers utilized in connection with beverage vending machines, an application for which the instant invention is primarily intended.

In connection with prior art vending machines it has been necessary from the very nature of the operation to measure out a given quantity of liquid, most often a single cupful. In many installations the liquid being measured and dispensed derives from a water supply containing minerals, impurities and foreign matter. The situation has been aggravated by the need for heating such liquid thus causing deposition of solids and increasing the rate of corrosion of metal parts and the clogging of screens.

Often the solution has utilized a solenoid valve in a liquid supply line with control means for keeping the solenoid open until a predetermined quantity of liquid has been dispensed. This may be done with either a sensor or with timing mechanism. Solenoid valves from their nature have but a limited life when working with even so mild a liquid as city water. A patent typical of this type of equipment is U.S. No. 3,085,496.

Where a heated beverage is involved it has been customary to maintain a reservoir of water and heat its contents, most often with immersion heating elements. Of necessity this involves loss of heat while the water is stored awaiting operation of the means for dispensing a portion of the contents of the reservoir.

Accordingly, there has been a need—particularly in the automatic beverage vending machine art for a simple dispenser which would dispense a cupful of liquid at a time, heated or pre-heated to some desired temperature, and which would involve only simple parts of a type which would be minimally effected by corrosion, deposition of minerals and foreign matter. Additionally there must be provision in such devices for adjustment of delivery volume.

BRIEF SUMMARY OF THE INVENTION

The invention comprises a dispenser having particular utility in the beverage vending field although of general application wherever there is a need for dispensing unit quantities of cold or heated liquid. Two main elements of the dispenser are a relatively large reservoir which feeds a closed metering tank having a volume approximately equal to the desired unit liquid quantity to be dispensed. The reservoir may be connected to a continuous source of supply or may be filled periodically. The liquid is discharged from the metering tank and the volume of the discharge may be adjusted.

The control of flow into and out of the metering tank is by a valve which includes a hollow housing within which a body is mounted for reciprocation between an advanced and a retarded position. The intermediate portion of the valve housing is in liquid communication with the interior of the metering tank and this can be most economically achieved by mounting the housing within the tank, an expedient which also conserves space and allows the housing portions to serve as a conduit connecting reservoir and tank as well as a discharge spout for the tank. The valve body is biased toward its retarded position utilizing either gravity, when mounting is vertical, or spring biasing. In the retarded position of the valve body, flow by gravity from reservoir into metering tank is possible—in the embodiment shown through the valve housing and out into the tank through the intermediate valve portion. The retarded valve body position prevents discharge from the metering tank.

The other extreme of the valve body has been arbitrarily termed the advanced position and, in that position, flow from reservoir into tank is prevented and flow out of the tank is allowed. The valve body, containing two valve portions, and the valve housing, containing two mating valve seat portions, are so dimensioned and spaced apart that only one valve portion can mate with its related seat at a given time. One thus has, in effect, a flip-flop type of operation.

The valve body operating means extend outside the valve body and actuation forces can be supplied by a solenoid operator or by any conventional mechanical linkages which can transmit sufficient force to overcome biasing forces and shift the valve body from its retarded to its advanced positions.

Where there is need for heating the water being dispensed this is done preferably by providing a metallic measuring tank and heating the mass of the tank itself, as distinguished from heating the water directly as with immersion heaters. The tank thus acts as a heat sing and transfers its sensible heat into the water using a large transfer "area" as the term area is used in the thermodynamic equation: $Q = UA\Delta t$.

Variation or adjustment of delivery volume is simply achieved by adjustment of a vent means which is provided between the interior of the tank and the atmosphere, the upper vent point being at a height greater than the maximum liquid level in the reservoir. The vent permits the water entering the tank from the reservoir to displace the air therein. However, any air present between the bottom of the vent, located within the interior of the tank, and the roof of the tank cannot escape and constitutes an "outage." This nonfilled-volume can be adjusted by raising or lowering the end of the vent within the tank. Consequently, the effective capacity of the tank can be adjusted, thus adjusting discharge volume.

Accordingly, it is an object of the invention to provide a liquid dispenser which contains a minimum of moving parts, which is inexpensive to build, easy to maintain and relatively free from corrosion.

It is also an object of the invention to provide a dispenser which can dispense adjustable unit quantities of liquid from a large reservoir and which can either dispense the liquid at the prevailing reservoir temperature or raise the temperature in the course of dispensing.

Still another object of the invention is to provide a dispenser which utilizes a single valve housing as a conduit between a reservoir and a metering tank and uses other portions of the same valve housing as a discharge spout, said spout cooperating with a flow guide which is an integral part of the valve body.

These and other objects of the invention will be apparent to those skilled in the art from a consideration of the description of an exemplary embodiment of the invention which follows. It should be appreciated that the foregoing abstract and summary are intended as tools for information retrieval and are not included for purposes of limiting or interpreting the true scope of the invention. This is the function only of the appended claims.

DESCRIPTION OF THE FIGURES

In the drawings, wherein like reference numerals indicate like parts:

FIG. 4 represents an exploded perspective view of the valve housing and valve body utilized in the embodiment of the invention shown in FIG. 1.

FIG. 5 represents an exploded perspective view of the vent utilized in the embodiment shown in FIG. 1.

DETAILED DESCRIPTION OF A PREFERRED EMBODIMENT

Figure 1:
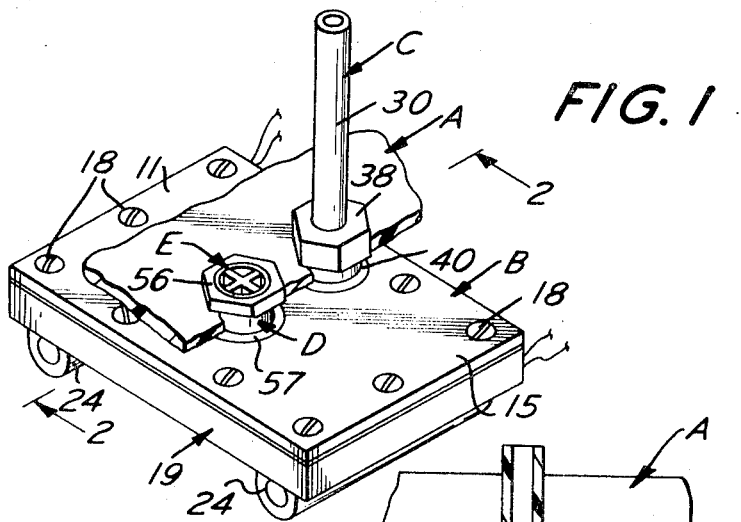
FIG. 1 represents a fragmentary perspective view of an embodiment of the invention.
Figure 3:
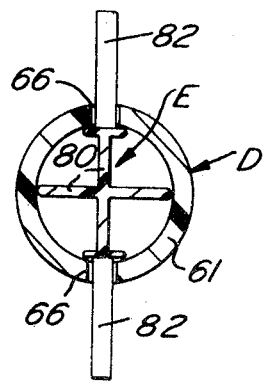
FIG. 3 is a section taken on line 3—3 of FIG. 2.
Figure 2:
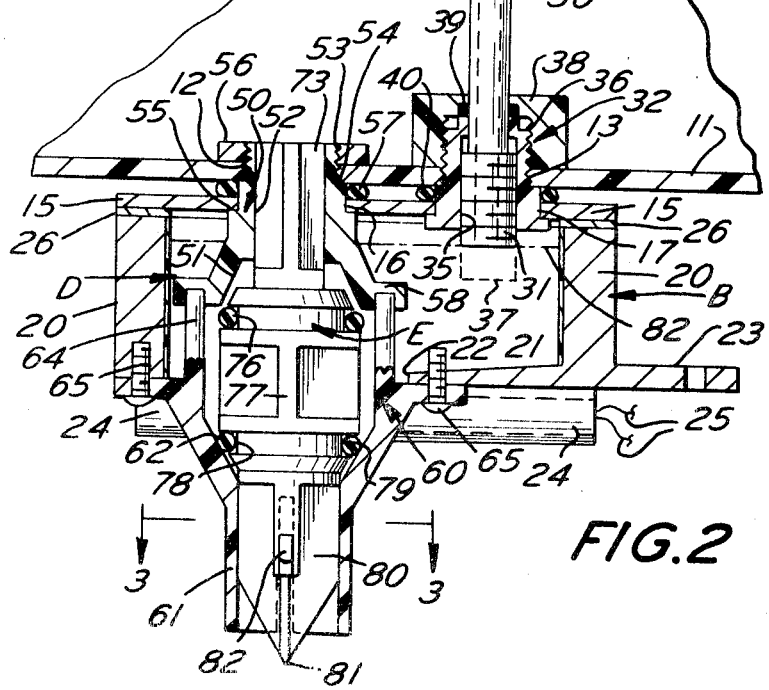
FIG. 2 represents a fragmentary section taken on line 2—2 of FIG. 1.

As best seen in FIGS. 1 and 2, the invention comprises a liquid reservoir, generally A, which feeds a closed metering tank, generally B, located below it. A vent, generally C, vents the upper portion of the interior of tank B to the atmosphere at a point above the maximum permissible liquid level in the reservoir. Operatively associated with tank B is a valve housing D, within which a valve body E is reciprocally mounted. These components and their function will now be discussed in detail.

The reservoir A may be of any shape and may be open or vented to the atmosphere in a conventional manner. It may be made of metal or a suitable plastic, consistent with the liquid being stored. It includes sides 10 and a bottom 11, which may be provided with an outlet orifice 12 and a vent orifice 13. The capacity of the reservoir is large, on the order of 50 to 100 cups and it may either be replenished at periodic intervals or connected to a source of liquid (e.g., a city water supply) which is conventionally controlled, for example, with a float controlled inlet valve.

Where constant level control is used, the liquid level in the reservoir is constant. Where periodic refilling occurs, the level in the reservoir drops incrementally between refills as liquid is dispensed. While dropping of the liquid level has some effect on the hydraulic relationships within the dispenser, the accuracy of dispensing stays within tolerances which are acceptable for most applications.

Metering tank B is mounted below reservoir A so that liquid can flow into it by gravity. In the embodiment shown it is mounted directly beneath reservoir A. The closed tank includes a top 15—having an inlet opening 16 and a vent opening 17. The top is mounted, as with screws 18, on a tank body, generally 19. Body 19 includes relatively thick side walls 20, a bottom 21—having an outlet opening 22, and an integral mounting bracket 23 which can be utilized for mounting the entire dispenser assembly. A plurality of heater tunnels 24 may also be provided as part of the body 19 and each of these may contain an electric heating element (not shown) to which electric power is supplied by wires 25. The mass of tank body 19, which is preferably metallic, is such that it serves as a heat sink and stores a quantity of sensible heat which is large enough to rapidly heat any liquid present in the metering tank. Further, since tunnels 24 are out of direct contact with liquid and not susceptible to the problems encountered with caking out and corrosion of immersion heaters, long service life is assured. A gasket 26 is interposed between walls 20 and top 15 to assure water-tight assembly.

Vent C serves to vent the upper interior of metering tank B to the atmosphere at an elevation at least as high as the maximum permissible liquid elevation in reservoir A. In this embodiment, the vent passes into the reservoir A to emerge above its liquid level but, alternatively, the vent may be totally external to the reservoir. The vent assembly is best understood with reference to FIGS. 2 and 5.

The vent itself comprises a tube 30 having an externally threaded end portion 31. A bushing, generally 32, is provided which has a lower shoulder 33, an upper shoulder 34, internal threads 35 and external threads 36. The tube 30 is mounted in bushing 32 with portion 31 threadedly engaging threaded bushing portion 35. The extent to which end 31 can protrude into tank B may thus be varied to the maximum extent indicated in phantom at 37 in FIG. 2. The bushing itself is mounted in opening 17 with shoulder portion 33 abutting the underside of top 15. The bushing and tube extend upward through vent orifice 13 into the interior of reservoir A to a point above the liquid level therein. A cap nut 38 is threadedly mounted on bushing portion 36 and thus compresses an O-ring gasket 39, between it and the end of the bushing as well as another larger O-ring gasket 40, between top 15 and bottom 11, to secure the entire assembly as shown in a liquid-tight manner.

Hollow valve housing D comprises an upper inlet portion 50, including an internal valve seat 51 (associated with the tank inlet), an inlet passage 52 which is externally threaded as at 53, an upper external shoulder 54 and a lower external shoulder 55.

As shown in FIG. 2, upper portion 50 is mounted within tank B so that it extends through inlet 16 with shoulder 55 abutting the underside of top 15, shoulder 54 abutting the exterior of bottom 11 and the inlet passage 52 extending into outlet orifice 12. A hex nut 56 engages threads 53 to tighten the assembly and compress an O-ring gasket 57, positioned about the exterior of passage 52 between bottom 11 and top 15.

Housing D also includes a lower portion 60 associated with tank outlet 22 which is provided with a discharge spout or outlet passage 61, an internal valve seat 62, a plurality of mounting holes 63, and a plurality of vertically extending spacer pins 64. The lower portion 60 is mounted on bottom 21, via holes 63, with a plurality of screws 65. Pins 64 are received and frictionally retained in holes 58 to space the upper and lower housing sections apart and to define therebetween an intermediate housing portion which is always open to the interior of tank B. Passage 61 is provided with two longitudinally extending slots 66, spaced 180° apart, which extend from the discharge end of the passage toward the seat 62, the purpose of which will be explained below.

Valve body E is preferably, when used with this particular housing, made of two portions, an upper portion 70 and a lower portion 71 which may be removably coupled to the upper portion with a threaded stud 72 (FIG. 4). Portion 70 includes a spider guide 73 composed of a plurality of radially extending walls 74 which touch the interior of passage 52, leaving fluid flow channels in between. A first valve groove 75, is also provided which receives a first renewable O-ring 76 which is adapted to sealingly mate with seat 51. The body includes a plurality of intermediate spacer ribs 77 and a second valve portion spaced apart from the first valve portion described above. This valve portion includes a second valve groove 78 and, removably snap-fitted thereto, a second renewable O-ring 79 which is adapted to sealingly mate with seat 62. It is important that the two valve portions be spaced so that only one of them can seat at a time as the valve reciprocates within the housing, as indicated by the double arrow in FIG. 2.

The bottom portion 71 includes a plurality of guide ribs 80 terminating in a point 81, which serve to cause the discharge fluid to converge into a single "focused" stream. Two of the ribs 80 are provided with arms 82 which cantilever outwardly through slots 66 and serve as actuating means for shifting the valve body E from its normal retarded position to its advanced position.

The assembly of the body and the housing need only be done during initial construction or repair. Lower portion 71 is inserted within passage 61 so that arms 82 extend through grooves 66. Portion 70, upon which O-rings 76 and 79 have been mounted, is then screwed onto stud 72 and valve body E thus assembled. Body E cannot then be removed from lower outlet portion 60 since contact between arms 82 and the closed end of grooves 66 limits motion in one direction and contact between O-ring 79 and seat 62 limits motion in the other direction. This assembly is then attached to upper inlet portion 50 by inserting pins 64 into drilled bosses 58 with which they may frictionally engage.

The mounting of portion 50 with hex nut 56 has been described previously. Alternatively, valve body E may be assembled together with portions 50 and 60, after which the entire assembly may be mounted with hex nut 56.

Operation of the dispenser will now be described. As shown in FIG. 2, valve body E is in its normal or retarded position and is biased in that position by gravity. In other embodiments of the invention spring bias may be utilized. In this position, as shown, O-ring 79 sealingly mates with valve seat 62 to prevent discharge of the contents of tank B through passage 61. The first valve, comprising O-ring 76 and seat 51, is open and, consequently, water is free to flow from reservoir A into tank B via inlet passage 52, through annular seat 51 and out into the tank between pins 64. Metering tank B fills, which is a rapid process, until it reaches a level indicated by line 82—which coincides with the bottom of vent portion 31. The air above this point is trapped and cannot escape or be displaced by the incoming liquid. The compression of this air pocket by hydraulic forces is not significant in the operation of the device and will not be further mentioned. If tube 30 is moved in or out, by rotating it within bushing 32, one varies the amount of air which will be trapped and thus adjusts the unit volume which will be dispensed. If the heater elements are utilized, the heat in the metal body 19 is transferred instantly to the liquid and the relationships may be calculated so that, for a fixed cycling rate, a constant temperature rise will occur.

In the second part of the cycle, arms 82 are utilized to actuate valve body E and shift it upwardly to its advanced position. As long as the bias is overcome the valve body will remain in this position. Movement of arms 82 can be induced with mechanical linkages, solenoids and the like and may be part of a larger vending machine apparatus. In the advanced position, O-ring 76 mates with seat 51 to prevent flow from reservoir A into tank B and O-ring 79 unseats to permit the entire contents of tank B, plus any water in tube 30, to discharge through outlet spout 61 to the utilization point. On removal of the unseating forces being applied to arms 82, the valve body is restored to its normal retarded position and the first part of the cycle is repeated. Thus substantially constant unit volumes of liquid (i.e. the adjusted volume of tank B) are incrementally dispensed from a larger body of liquid (i.e. reservoir A) in a simple and efficient manner.

It will be apparent to those skilled in the art that numerous changes and modifications may be made within the scope of the invention. Consequently, it is not to be construed as limited to the details of the specific embodiment which has been described above. Rather, it is to be limited only by a reasonable interpretation of the appended claims.

I claim:

1. A dispenser for dispensing substantially constant predetermined unit volumes of liquid comprising:
    (a) a liquid reservoir maintained at atmospheric pressure and having a capacity equivalent to a plurality of unit liquid volumes;
    (b) a closed metering tank, having a capacity of approximately one unit liquid volume, located directly beneath said reservoir and gravity-fed by it;
    (c) a vent connecting an upper interior portion of said metering tank and the atmosphere at an elevation at least as high as the maximum permissible liquid level in said reservoir
    (d) a hollow valve housing, of generally circular cross-section, extending vertically from the bottom of said reservoir through the entire depth of said metering tank, including: an upper inlet portion—connecting the bottom of the reservoir and the top of the metering tank, an intermediate portion—located entirely within the confines of the metering tank, and a lower outlet portion—extending from within the metering tank to the exterior thereof, all of said portions being in concentric alignment
        said upper portion including a hollow, generally frusto-conical portion the apex of which extends upward into the bottom of said reservoir, to serve as a conduit to said intermediate portion, and the base of which is located within said metering tank, the base including a first internal valve seat,
        said lower portion iicluding an inverted hollow frusto-conical portion, the apex of which terminates beneath said metering tank in a cylindrical spout and the base of which faces the base of said upper portion and includes a second internal valve seat,
        said intermediate portion comprising a plurality of peripherally spaced pins connecting the bases of both frusto-conical portions to define a cage therebetween and to place the interior of said valve housing in continuous hydraulic communication with the interior of said metering tank;
    (e) a longitudinally extending valve body mounted within said housing for reciprocation between an advanced and a retarded position, which body includes:
        an upper valve portion having a first valve, which sealingly mates with said first valve seat when said body is in its advanced position and thus cuts off flow from reservoir to tank, said upper portion also including a plurality of radially extending fins which slideably fit within the apex of said upper valve housing portion to guide said reciprocating valve body and to define therebetween internal flow passages;

and a lower valve portion including a second valve, which sealingly mates with said second valve seat when said body is in its retarded position and thus prevents discharge from said tank, said lower valve portion including an extension which is slideably received within the cylindrical spout of said lower portion and provides additional guidance for said body within said housing, said upper and lower valve portions being spaced apart vertically so that only one valve can mate at a time, said valve body being biased so that it is normally in its retarded position;

(f) actuating means for temporarily overcoming the normal bias and shifting said body from its retarded to its advanced position;

whereby said measuring tank contains a unit volume of liquid which is discharged when said valve body is advanced and replenished from the reservoir when said valve body returns to its normal retarded position.

2. The dispenser of claim 1 wherein the upper and lower portions of said valve body include a peripheral groove in which is mounted an O-ring, said O-rings constituting, respectively, said first and second valves.

3. The dispenser of claim 1 wherein said metering tank is constructed of heat conductive material and which, further, includes heating means encapsulated in the walls thereof, out of contact with the liquid therein, said heating means warming the mass of said tank and the liquid present therein.

4. The dispenser of claim 1 wherein the extension of said lower valve portion which is within said spout is fluted and tapered, the taper serving to shape and define the discharge stream and the spaces between the flutes thereof constituting passageways for conducting liquid out of said metering tank.

5. The dispenser of claim 1 which includes means for adjusting the vent so as to vary the height of its discharge point and thereby adjust the unit volume of liquid actually discharged from said metering tank with each cycle of operation.

6. The dispenser of claim 2 wherein said metering tank is constructed of heat conductive material and which, further, includes heating means encapsulated in the walls thereof, out of contact with the liquid therein, said heating means warming the mass of said tank and the liquid present therein.

7. The dispenser of claim 2 wherein the extension of said lower valve portion which is within said spout is fluted and tapered, the taper serving to shape and define the discharge stream and the spaces between the flutes thereof constituting passageways for conducting liquid out of said metering tank.

8. The dispenser of claim 3 wherein the extension of said lower valve portion which is within said spout is fluted and tapered, the taper serving to shape and define the discharge stream and the spaces between the flutes thereof constituting passageways for conducting liquid out of said metering tank.

9. The dispenser of claim 4 which also includes means for adjusting the vent so as to vary the height of its discharge point and thereby adjust the unit volume of liquid actually discharged from said metering tank with each cycle of operation.

References Cited

UNITED STATES PATENTS

| | | | |
|---|---|---|---|
| 1,086,566 | 2/1914 | Smith | 222—453 X |
| 2,307,223 | 1/1943 | Kerr | 222—453 X |
| 2,759,638 | 8/1956 | Howard | 222—453 X |
| 2,887,255 | 5/1959 | Bauerlein | 222—453 |
| 3,133,671 | 5/1964 | Christine et al. | 222—146 X |
| 3,178,557 | 4/1965 | Umann | 222—146 X |

ROBERT B. REEVES, Primary Examiner

H. S. LANE, Assistant Examiner

U.S. Cl. X.R.

222—437